H. D. WILLIAMS AND W. AHLEN.
METAL HEATING FURNACE.
APPLICATION FILED JULY 27, 1916.
1,336,266.
Patented Apr. 6, 1920.
2 SHEETS—SHEET 1.
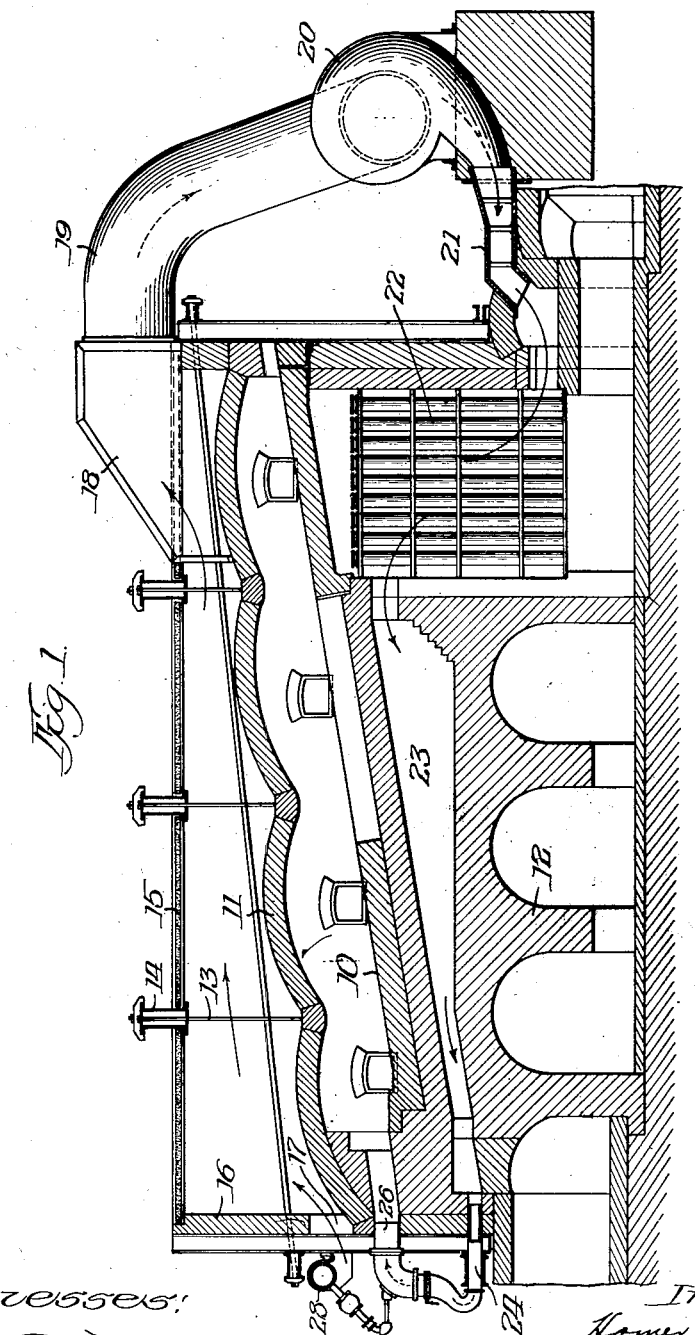

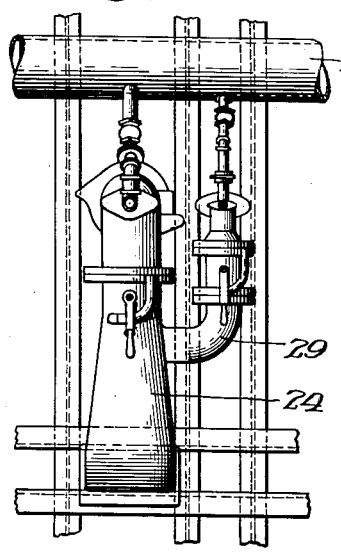
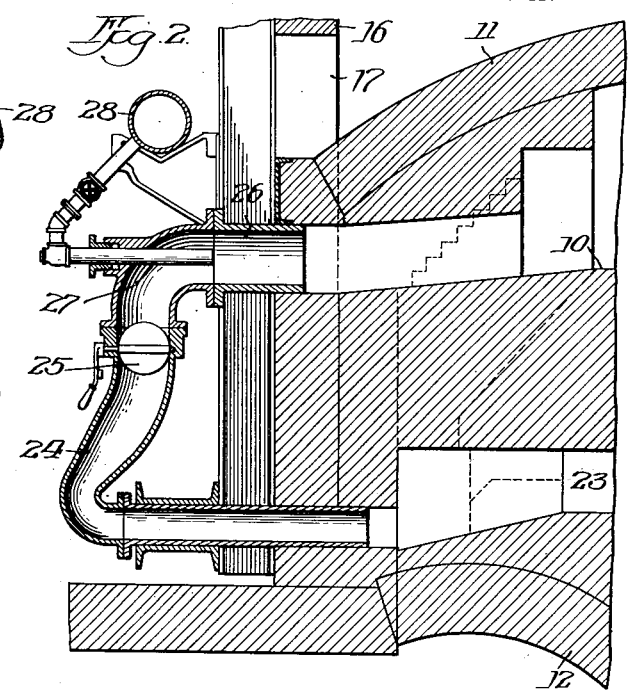
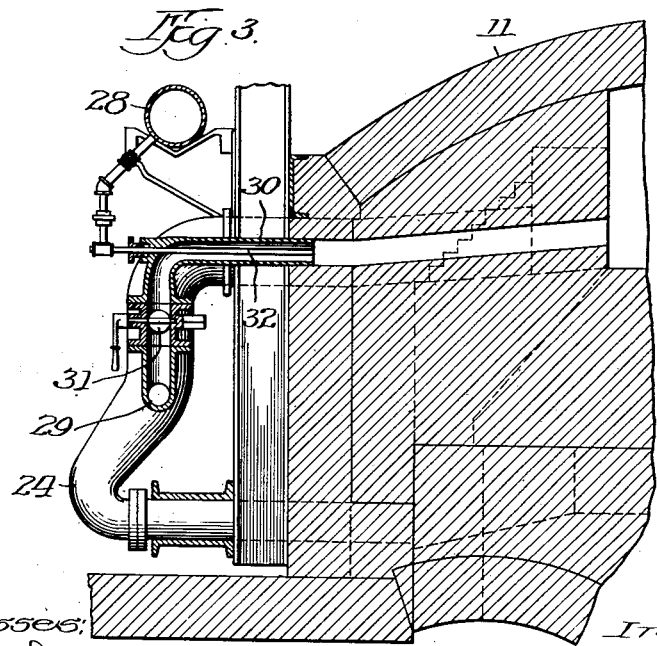

UNITED STATES PATENT OFFICE.

HOMER D. WILLIAMS, OF PITTSBURGH, AND WILLIAM AHLEN, OF DUQUESNE, PENNSYLVANIA.

METAL-HEATING FURNACE.

1,336,266.   Specification of Letters Patent.   Patented Apr. 6, 1920.

Application filed July 27, 1916. Serial No. 111,601.

*To all whom it may concern:*

Be it known that we, HOMER D. WILLIAMS, a citizen of the United States, and resident of Pittsburgh, in the county of Allegheny and State of Pennsylvania, and WILLIAM AHLEN, a subject of the King of Sweden, and resident of Duquesne, in the county of Allegheny and State of Pennsylvania, have invented certain new and useful Improvements in Metal-Heating Furnaces, of which the following is a specification.

Our invention relates to means for applying heat to furnaces and has particular reference to a novel recuperating heating furnace and an arrangement of burners for use in connection therewith.

An object in the construction of the herein described furnace is to provide means whereby the air for use in the burners is caused to enter near the burner end of the furnace, pass over the roof thereof through a recuperator, and underneath the hearth in order that such air may be highly heated when it reaches the point of use.

A further object is to provide two series of burners for such furnaces, a large burner in which a large amount of gas may be burned economically and a small burner in which a small amount of gas is economically burned. The reason for this is that these furnaces are not operated continuously at the full heating capacity of the furnace and at such times as they are idle or are being held back or "slowed down" it is desirable and in fact necessary to keep up the heat therein. At other times it is desirable to force the heating of the material in the furnace adjacent to the exit end of the heating chamber to a greater extent than at or in proximity to the opposite or discharge end. To operate the large burner even at its minimum capacity requires much more gas and develops much more heat than is necessary. For these reasons we provide a series of small burners which economically burn a small quantity of gas and keep the furnace suitably heated under all operating conditions.

The invention will be more readily understood by reference to the accompanying drawings, wherein Figure 1 is a longitudinal section through a furnace constructed in accordance with our invention;

Fig. 2 is a fragmentary vertical section enlarged over that shown in Fig. 1, the section being taken through the large burner;

Fig. 3 is a view similar to Fig. 2, the section being taken through the small burner, and Fig. 4 is an end view of the two burners.

In the drawings it will be seen that the furnace which is shown as an ordinary inclined floor heating furnace comprises a hearth 10, roof 11 and foundation arches 12. The roof is supported by means of rods 13, supported at their upper ends on girders 14. Between the girders we extend the covering members 15, the arrangement being such that the roof 11 is inclosed. An end wall 16 is provided, an opening 17 being left in the lower portion of the wall, this opening being adjacent to the burners and in a plane with the top of the roof. At the right hand end of the furnace as viewed in Fig. 1, an outlet 18 is formed which provides a connection to the conduit 19, the lower end of which terminates in a fan 20. The fan outlet is directed into a conduit 21, which discharges into the space surrounding the recuperator tubes 22. Thereafter the air passes through the space 23 underneath the hearth to the conduit 24, which connects directly with the large burner. The amount of air is controlled by the butterfly valve 25. Gas is supplied axially of the burner tube 26 by means of the pipe 27, which is a branch from the main 28.

By referring to Fig. 4 it will be seen that the conduit 24 is provided with a branch 29 of relatively small size, which branch terminates in the small burner tube 30, best shown in Fig. 3, the amount of air being controlled by the butterfly valve 31. Gas is supplied to this small burner by the pipe 32, which is connected to the main 28. This burner may be and preferably is a duplicate, except as to size, of the larger burner. In normal operation the small burner will be disconnected; that is, the butterfly 31 will be closed and the gas controlling valve will likewise be closed. However, when the operation of the furnace is discontinued, as, for instance, at night or over Sunday, the small burner is connected and the large burner discontinued. By this means a small quantity of gas is economically burned and the furnace is properly heated to the extent necessary.

While I have shown a fan in the air line, it will be understood that this is not essential if there is sufficient stack pull, although in most instances it will be found more economical as a burner of this type will operate more economically under a pressure greater than can ordinarily be secured by the stack. In some instances it is found desirable to utilize the auxiliary burner in connection with the large burner, as, for instance, when starting up after a large quantity of cold material has been placed on the hearth, and it is desirable to quickly heat the material nearest the discharge outlet or door to a rolling temperature.

We claim:

1. In a metal heating furnace, the combination with the furnace heating chamber, of a plurality of large burners, a plurality of small burners at one end of said heating chamber, means for supplying gas to said burners, and means for supplying preheated air under pressure to said burners, said means including an air heating chamber having an air inlet at one end open to the atmosphere, a fan having an inlet connected to the outlet on said air heating chamber, a recuperator having an air inlet connected to the fan outlet, a heating chamber having an inlet connected to the air outlet on said recuperator, and a conduit connecting the outlet on said heating chamber to said large burner, a branch conduit connecting said small burner with said first named burner, and suitable control valves in said conduits.

2. In a metal heating furnace, the combination with the furnace heating chamber, of a plurality of pairs of burners at one end of said heating chamber, each pair comprising a burner of large capacity and one of relatively small capacity, means for supplying gas to said burners, and means for supplying heated air under pressure to said burners, said means including an air heating chamber having an air inlet at one end open to the atmosphere, a fan having an inlet connected to the outlet on said air heating chamber, a recuperator having an air inlet connected to the fan outlet, a heating chamber having an inlet connected to the air outlet on said recuperator, and a conduit connecting the outlet on said heating chamber to said large burner, a branch conduit connecting said small burner with said first named burner, and means for regulating and controlling the supply of fuel and air to said burners, whereby the large or small burners may be discontinued at will.

3. In a heating furnace, the combination with the furnace heating chamber, of a gas burner at one end of said heating chamber, means for supplying gas to said burner, and means for supplying heated air under pressure to said burner, said means including an air heating chamber above said furnace having an air inlet at one end open to the atmosphere, a fan having an inlet connected to the outlet on said air heating chamber, a recuperator having an air inlet connected to the fan outlet, a heating chamber below the furnace having an inlet connected to the air outlet on said recuperator, and a conduit connecting the outlet on said heating chamber to the air inlet of said gas burner substantially as described.

Signed at Duquesne, Pa., this 24 day of July, 1916.

HOMER D. WILLIAMS.
WILLIAM AHLEN.

Witnesses:
H. G. SAYLOR,
GEO. L. NEFF.